Feb. 3, 1942.          J. M. PEARSON ET AL          2,271,951
              ELECTRICAL PROSPECTING METHOD AND APPARATUS
                   Filed Feb. 12, 1936          3 Sheets-Sheet 1
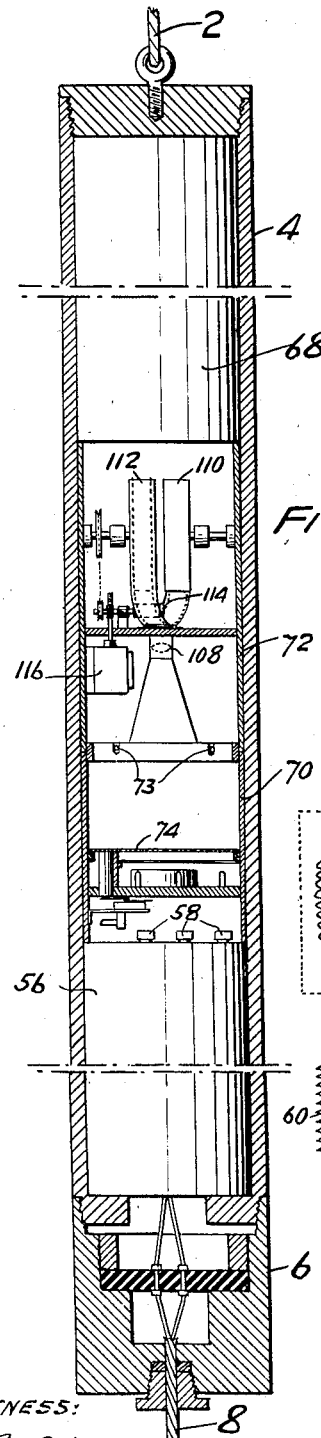
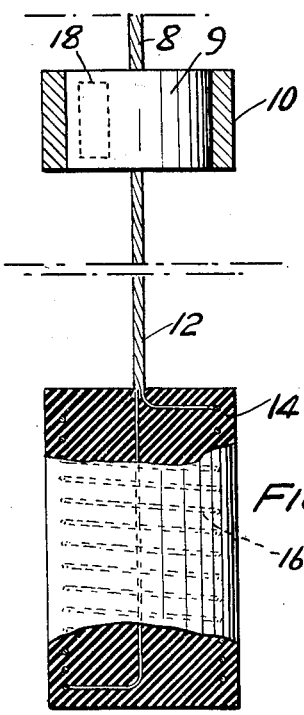
FIG.1A.          FIG.1B.
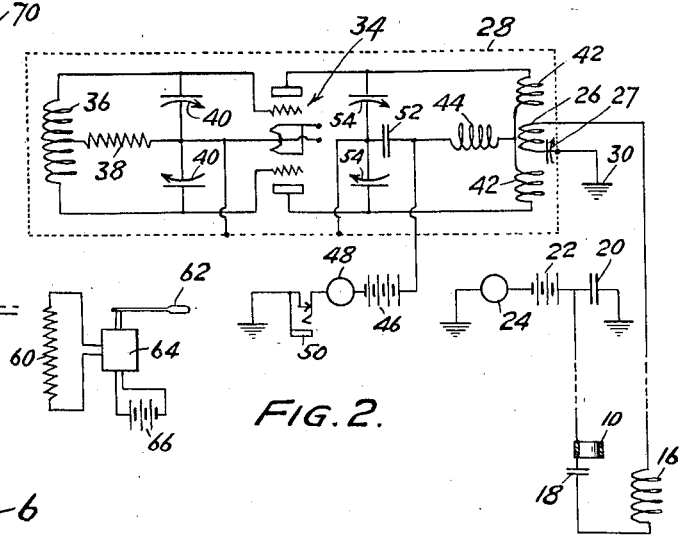
FIG.2.
WITNESS:
INVENTORS
John M. Pearson
George A. Smith
        BY
                ATTORNEYS.

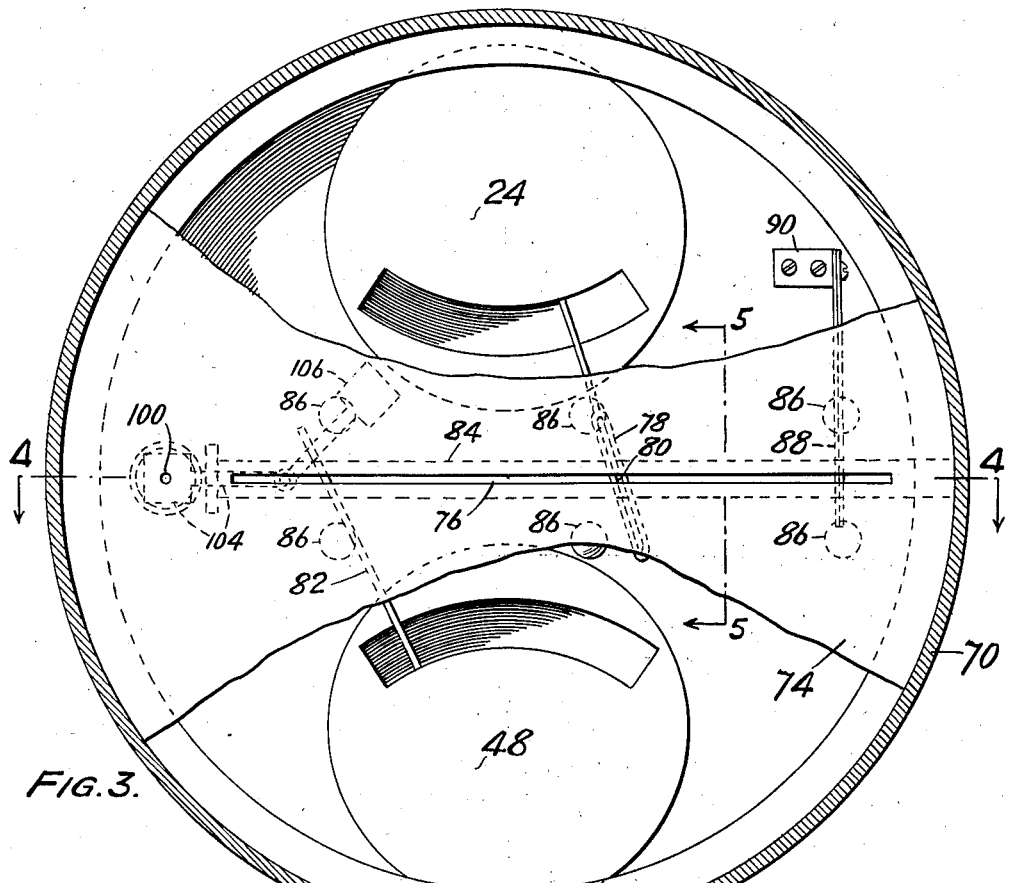
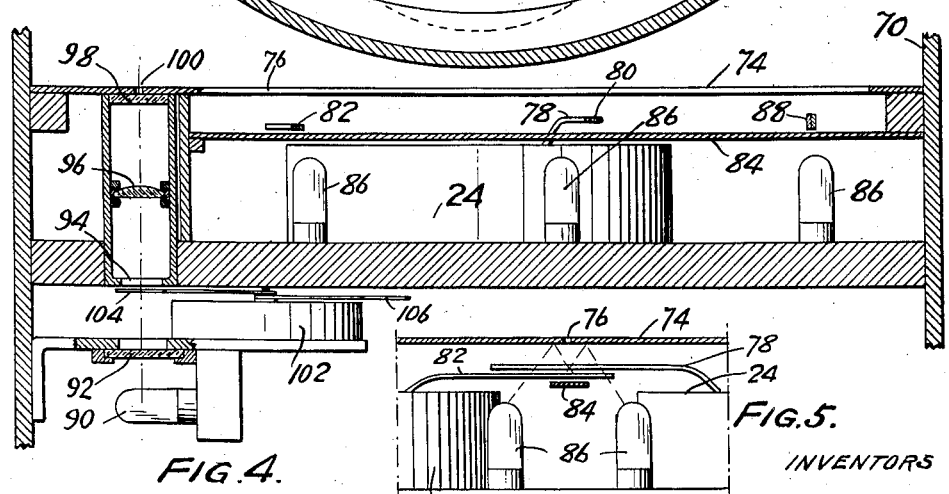

INVENTORS
John M. Pearson
George A. Smith
BY
ATTORNEYS.

WITNESS:

Patented Feb. 3, 1942

2,271,951

UNITED STATES PATENT OFFICE 2,271,951

ELECTRICAL PROSPECTING METHOD AND APPARATUS

John M. Pearson, Swarthmore, and George A. Smith, Philadelphia, Pa., assignors to Sperry-Sun Well Surveying Company, Philadelphia, Pa., a corporation of Delaware Application February 12, 1936, Serial No. 63,558

21 Claims. (Cl. 175—182)

This invention relates to geophysical prospecting and more particularly, by so-called electrical coring, to the determination of the nature and boundaries of strata traversed by bore holes.

The various strata which make up the portion of the crust of the earth which has been penetrated by bore holes vary quite considerably in their specific resistivities and dielectric constants. In view of this, proposals have been made to determine the location and nature of subterranean strata by producing high frequency electromagnetic fields in such fashions that they will be substantially affected by the presence of the strata under investigation. If a source giving rise to a high frequency electromagnetic field is located at or adjacent the surface of the earth, and if the field is given the necessary spacial disposition, its characteristics measured by its reaction on the source, or, alternatively, by a suitable detector located at different distances from the source, will give information from which deductions may be made as to the nature and location of subterranean formations.

It was proposed in Löwy Patent No. 1,092,065, dated March 31, 1914, to determine the nature and location of subterranean formations by producing fields of this type in bore holes or mines. In the case of a mine, the method described in this patent could be carried out by having an observer operate the apparatus directly at the source of the high frequency field. In using the method in a bore hole, however, it would be necessary to supply some telemetering apparatus to carry the results produced at the location of the source to the surface in order to be observable.

It is the general object of the present invention to provide a method and apparatus whereby records are made in a bore hole at a short distance from an electromagnetic field the variations of which, due to the presence of different strata in the vicinity of the source, are to be measured. More specifically, in accordance with the invention, there is generated a high frequency electromagnetic field within a bore hole by means of an exploring unit which may be lowered into the hole by means of a wire line or drill stem. The apparatus includes a suitable exciting element which may take the form of an antenna or a coil, either of which is arranged so that a substantial part of its resulting electromagnetic field penetrates the formations through which the bore hole passes. In the case of an antenna, the dielectric constants and resistivities of the surrounding strata will vary its impedance and hence its reaction upon the generating circuit by reason of its ability to take more or less current input at various phase angles, or, if the circuit is so designed, to vary the frequency of the oscillations. The major effects in this case will be due to the different dielectric constants. If a coil is used, on the other hand, it will have an effective impedance dependent primarily upon the specific resistivities of the strata lying within the portion of its field adjacent the coil and the varying impedance thus resulting as the apparatus traverses the bore hole will show itself either by a variation in the current input or, depending on the nature of the oscillatory circuit, in the natural frequency of oscillation. While a coil or antenna has just been mentioned as supplying a high frequency electromagnetic field, and while the detection of various strata has been indicated as resulting from measurement of the variations produced in an oscillating supply circuit by reason of modifications of its electromagnetic field due to different strata, there are many other obvious ways in which high frequency may be made to detect the presence of varying types of strata as, for example, by the lowering of two coils spaced from each other with their axes coinciding, a high frequency current of substantially constant amount being fed to one and measurement made of the current induced in the other. In such case the detection of formations would depend upon the observation of results dependent upon the variation in coupling of the two circuits. In general, it may be said that the configuration of a high frequency electromagnetic field is made dependent upon strata which it penetrates, and that the configuration is detected by its action upon a circuit which may or may not be its generating one.

The present invention is not, however, particularly concerned with the specific method of generating high frequency oscillations or detecting variations in circuit parameters resulting from the presence of different strata, although as a specific object of the invention there may be cited the provision of two simple and reliable circuits for detection purposes which are particularly well suited for the attainment of compactness and direct recording.

The invention is primarily concerned with the automatic recording within the bore hole of variations in electrical characteristics of a high frequency circuit of which the strata surrounding the bore hole forms an appreciable part. Such automatic recording within the bore hole avoids the necessity for running conducting cables to the surface, which cables, by reason of the fact that they must be armored, are very expensive, and in spite of the best armor rapidly wear out due to friction with the walls of bore holes, and which, at the surface, are comparatively difficult to handle by reason of the fact that electrical connections must be made to them during all phases of the reeling operation. Insulation of such cables is, furthermore, ineffective at great depths when long lengths are considered, since the penetration of water into the insulation at the enormous pressures encountered greatly increases the leakage. Furthermore, such arrangements heretofore proposed have necessitated the presence of an observer, who must note the results telemetered to him from the apparatus within the hole and who can, at best, enter only discontinuous data which, of course, is always subject to personal observational errors. Furthermore, unless the apparatus is lowered extremely slowly so as to accommodate itself to the observer, it is quite likely that he would miss entirely formations of very little thickness.

In accordance with the present invention, there is produced a photographic or similar record of continuous nature within the bore hole by means of apparatus preferably located in the casing with a high frequency generator, or, if the generator does not in itself constitute the detecting apparatus, then in the casing with the detecting apparatus. At the same time, time indications are formed on the film forming a continuous record showing when detected variations in the circuit characteristics occurred. By providing at the surface a synchronized apparatus for automatically recording the times at which various depths are attained, it is possible to ascertain precisely at what depth there occurred a variation which would be indicative of a formation of interest. The records thus produced are not subject to any observational error and may be permanently preserved. Furthermore, the arrangement is preferably such that very thin strata cannot be missed despite a very rapid lowering of the apparatus although, with quite rapid lowering, it might not be possible to ascertain the thickness of a thin stratum. A complete record may be made in a bore hole in a very short time, thus holding up for a minimum period the progress of drilling. It may be remarked that the major drawback to the use of electrical coring methods heretofore proposed is the interruption of the drilling occasioned thereby.

Furthermore, the apparatus may be combined with a multiple shot type of well surveying apparatus so as to produce simultaneously not only the records of the strata traversed but also of the direction of the bore hole. This is made possible since a protective casing of a well surveying instrument may be connected directly to and above the electrical coring apparatus without the necessity for by-passing the surveying apparatus by any electrical cable running to the surface. The electrical coring apparatus, furthermore, may be used either alone or in combination with well surveying apparatus on the lower end of a drill stem. Unless special drill stems are used, it is impossible to carry electrical indications from instruments at the lower end of a drill stem to the surface. With the present apparatus, however, which forms its complete records at the point where observations are being made, use on a drill stem is possible. In such case, because of the comparatively limited supply of film which may be carried in an apparatus designed to fit a small bore hole, the formation of records is preferably carried on in an interrupted fashion, there being periods of recording with intermediate periods of inactivity of the recording apparatus of accurately measured length so that workmen at the surface may attach additional fourble lengths of drill stem during periods of inactivity and then slowly lower the apparatus during the periods of activity.

The various objects of the invention, including not only the broad ones indicated above but more specific ones directed primarily to details, will be apparent from the following description read in conjunction with the accompanying drawings, in which:

Fig. 1A is a vertical section showing, in a diagrammatic form, a protective casing and various elements located therein providing a preferred form of apparatus in accordance with the invention;

Fig. 1B is a continuation of the lower portion of Fig. 1A showing the exploring elements;

Fig. 2 is a wiring diagram showing the electrical connections involved in the preferred form of apparatus;

Fig. 3 is a transverse section showing the instruments which are photographed to produce the records;

Fig. 4 is a vertical section taken on the plane indicated at 4—4 in Fig. 3;

Fig. 5 is a vertical section taken on the plane indicated at 5—5 in Fig. 3;

Figure 7:
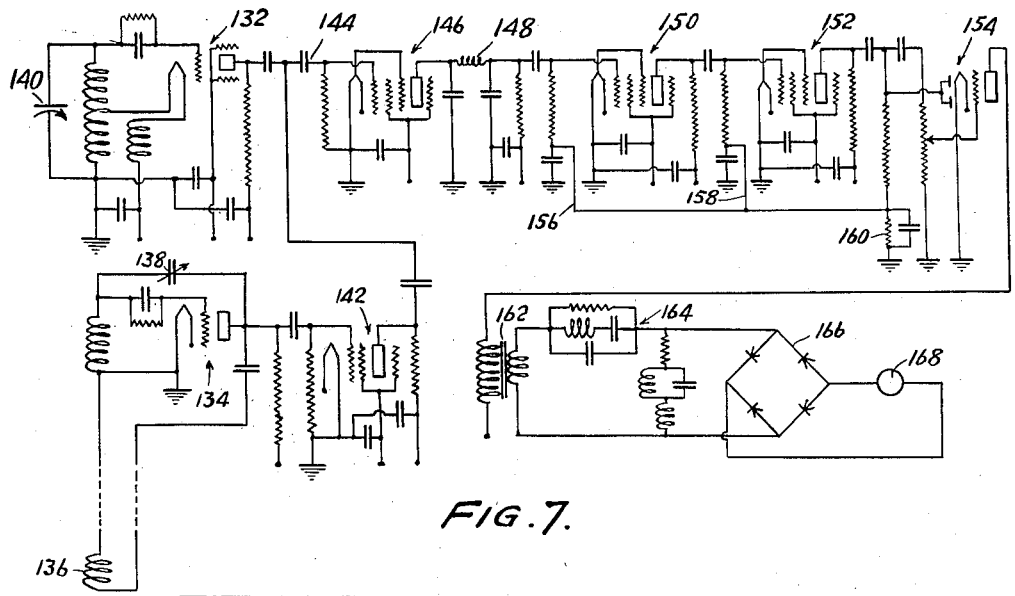
Fig. 7 shows an alternative circuit arrangement which may be used in carrying out the invention.

Referring first to Figs. 1A to 5, inclusive, there is shown as supported by a cable 2 an exploring unit including a protective casing 4 capable of withstanding the pressures which would be encountered in the deepest mud-filled bore hole in which the apparatus is to be used. The bottom of this casing is closed by a plug 6 which is packed in such fashion as to permit the passage of an armored two-wire cable 8, the lower end of which is connected within a molded body 9 of insulating material which carries an electrode 10 in the nature of a ring, to which electrode reference will be made hereafter. The length of the cable 8 need not be very great. For example, it may be of the order of anything more than about fifteen times the diameter of the bore hole, though there is no particular objection to having it substantially less than this. The spacing, as will be explained later, is primarily to insure that the readings obtained by the use of this electrode will be influenced to a satisfactory small amount by the mud within the bore hole and to a maximum amount by the formations through which the bore hole penetrates.

A cable 12 continues below the member 9 also carrying two wires which connect with the ends of a coil 16, preferably molded within or otherwise carried by an insulating support indicated at 14 which is made of such nature as not to be crushed by the high pressures encountered in the hole. The coil 16 is of the largest diameter which may be conveniently used in the bore hole, so that a considerable proportion of the lines of force of its field penetrate the formations. Its axial length should be small in order to increase the possibility of detecting very shallow formations.

The cable 12 need not be of great length but should be such that if a continuous conducting ring forms the electrode 10, it will have only a very small coupling with the coil 16, since otherwise it might form a substantial short circuit. The distance between the coil 16 and the electrode 10 may be lessened if the electrode 10 is split so as not to form a short circuiting coil, though even then it is desirable to maintain the spacing so great as to avoid the setting up of substantial eddy currents within the electrode.

Reference may now be made to the oscillation generating circuit indicated in Fig. 2. The electrode 10 and coil 16 are shown therein. A condenser 18, which may be embedded in the molded support 9 as indicated in Fig. 1B, is electrically interposed between the coil 16 and the electrode 10 in order to by-pass high frequency currents but stop direct currents. The second by-pass condenser 20 is interposed between the lead from the electrode 10 located in the cable 8 and the ground which, in common with the other grounds indicated in Fig. 2, is formed by the protective casing 4. A battery 22 is arranged to supply current through the electrode 10 to the earth on one side, while on the other side it is grounded through an ammeter 24 to the casing. The elements 10, 22 and 24, together with the ground connection, form a complete direct current circuit, the current in which will be dependent upon the average specific resistivity of the stratum surrounding the electrode 10 at any instant. If desired, this circuit may be omitted, though it is conveniently used to form a check on the high frequency coring apparatus and to give additional informative data. The readings of the ammeter 24 are photographically recorded, as brought out later. The condensers 18 and 20 isolate this direct current circuit from the high frequency circuit, there being common to the two only the portion of the cable between the condensers.

The high frequency circuit on the other side of the coil 16 is connected to a coupling coil 26 grounded, through a tuning condenser 27, at 30 and arranged to take high frequency current from the plate tank coil 42 of an oscillator. This coupling coil may alternatively be coupled to the grid coil 36. This coil is arranged to have adjustable coupling with the coil 42 so that there may be initially provided such an adjustment as will insure that the oscillations will not cease in the normal operation in any particular bore hole. The tuning condenser 27 may be adjusted for best performance.

The entire high frequency oscillator circuit is thoroughly shielded by means of a grounded shield indicated at 28. Within this shield there is located the oscillator which is shown as of the push-pull, tuned-plate, tuned-grid variety. This circuit may contain either two tubes or a single tube of the dual-triode variety such as, for example, the type '19 which requires for its operation low filament current and voltage and also a comparatively low plate voltage besides being quite small and hence well adapted for a compact unit. The grid coil 36 is shunted by a pair of variable condensers 40 formed by the two parts of a split-stator condenser which may be adjusted exteriorly of the shield by one of a series of suitable adjusting knobs indicated at 58 in Fig. 1A. A grid leak 38 is provided as shown. The plate tank coil 42 is similarly shunted by a split-stator condenser 54 also capable of manipulation through one of knobs 58. The high plate voltage is supplied from a battery 46 through a choke 44 to the central portion of coil 42, there being provided a by-pass condenser 52 as indicated. In the negative lead of the battery 46 there is located a milliammeter 48 and a jack 50 into which there may be plugged a meter for convenient surface adjustment of the circuit. The battery 46, meter 48 and jack 50 are outside the shield 28.

The type of oscillating circuit which has been shown is chosen because the plate current depends very much upon the high frequency load which is provided by the coil 26 and its exterior circuit which involves the formations in the vicinity of the exploring coil 16. If the circuit adjustments are such that oscillations are occurring with a minimum load provided by the detecting circuit, the plate current is quite low. The plate current rapidly increases, however, as the load increases until a point is reached where the oscillations stop and the plate current assumes its maximum value. The range of variation of the plate current in a circuit of this type is quite considerable, and by suitably adjusting the tuning of the grid and plate circuits, may be made highly responsive to even minor changes in the load. The operation of this circuit is well understood, since it is a common one used in small transmitters and it need not be described in detail. It need only be mentioned that the adjustments are so made by varying the condensers 40 and 54 and adjusting the mutual inductance between the coils 26 and 42 that the oscillations will not cease throughout the range of maximum changes which may be expected in a particular run. The circuit may be adjusted at the surface, for example, by placing the coil 16 in the slush pit or some other body of fluid which has a conductivity greater than the maximum which would probably be encountered in the bore hole. Adjustments may then be made so that the circuit is loaded to a maximum amount short of preventing the continuation of oscillations. Inasmuch as strata which are penetrated can be expected to be less conductive than a liquid of substantial conductivity, it may then be expected that in all parts of the bore hole less load will be imposed on the generating circuit and that consequently it will continuously oscillate throughout the run. The adjustments should also be made such that a maximum change of the readings of the meter 48 will be secured. The meter may be mechanically or electrically biased so that the expected change will be approximately through its full range.

As is well known, temperatures which are very high are sometimes encountered in deep bore holes, running sometimes fairly near the boiling point of water at atmospheric pressures. The oscillating conditions of a circuit such as that shown are very materially altered by temperature changes and it is desirable, therefore, to secure stable operation by thermostatic control. To insure this, the shielded circuit should be enclosed in a moderately heat-insulated outer casing indicated at 56 in which there is located a heating coil 60 connected through a relay 64 to a source of heating current 66 such as a storage battery, the relay being under control of a thermostat element 62 located within the insulating casing 56. The thermostat is set to hold the oscillating circuit at a temperature substantially higher than the highest which may be expected to be encountered in the bore hole. By the use of a tube such as that indicated there is comparatively little heat generated in the oscillating circuit itself and consequently if the thermostat is arranged as indicated above so as to have control over the heater 60, it is possible to run the oscillating circuit in a bore hole at a constant temperature until a bore hole temperature is encountered which is little lower than the temperature for which the thermostat is set so that the heat generated in the oscillating circuit may be expected to raise the temperature of the oscillating circuit above that established by the thermostat due to the relatively small gradient from the interior to the exterior of the insulating casing 56. This casing should, of course, not be by any means a perfect insulator but should furnish insurance against rapid variations in temperature of the oscillator though for any moderate temperature gradient it should very readily pass the heat generated in the oscillating circuit.

The batteries are conveniently located in a separate chamber indicated at 68 at the upper portion of the protective casing 4. Beneath this, there are located two auxiliary casings 70 and 72 lined up relatively to each other, for example by pin and slot connections indicated at 73, so that apparatus carried by the former may be located in proper position to be photographed by an automatic camera carried by the latter. The apparatus contained in the chamber 70 is shown in detail in Figs. 3 to 5, inclusive. The chamber is provided with a transverse plate 74 which closes the chamber 70 except for a narrow slit 76 and a small opening 100 located as shown in the figures, the width of the slit being somewhat exaggerated therein. The two meters 24 and 48 are located on opposite sides of the slit 76 and are provided with extended needles 78 and 82. Preferably these needles are differentiated by having one, for example 78, provided with a lengthwise slit 80 in order to form distinguishable records. As indicated in Figs. 4 and 5, the needles 78 and 82 move in different horizontal planes so as to clear each other. Extending lengthwise beneath the slit 76 there is a strip 84 the upper face of which is blackened, as is also the upper face of the plate 74, to prevent reflections which might fog the film. The upper surfaces of the needles 82 and 78 are whitened so as to reflect light, while the lower surface of the plate 74 is silvered or whitened so as to reflect light from lamps 86 downwardly upon the needles 78 and 82, as indicated in Fig. 5. The needles in conjunction with the slit present a spot projected on the film by the lens system, which spot during operation moves transversely of the direction of movement of the film.

Beneath the right-hand end of the slit 76 as viewed in Figs. 3 and 4, there is located a bimetallic strip 88 anchored at 90 and functioning as a thermometer. This strip has a whitened upper surface which is illuminated by reflected light like the needles 78 and 82. This strip is arranged to move in an outward direction as the temperature increases so as to pass beyond the end of the slit 76 if the temperature in the bore hole rises to such a point that the gradient in temperature between the oscillating circuit and the bore hole is insufficient to take care of removal of the heat generated in the oscillating circuit and hence prevent the rise of the temperature in the oscillating circuit above that set by the thermostat. In other words, the disappearance of a record of the strip 88 will give warning that the recorded results may no longer be accurate. The circuit, however, may be adjusted so that temperature compensation takes place to a considerable degree with the result that substantial accuracy may be assumed even though the temperature of the oscillating circuit may rise considerably above normal. This is particularly true where merely qualitative results are desired giving indications of boundaries rather than quantitative indications of the nature of the strata penetrated.

In order to give time measurements from which the depth may be ascertained, a lamp 90 is provided to illuminate a ground glass target 92 located beneath an opening 94 which permits light to pass from the target 92 to a lens 96 which concentrates it upon a ground glass 98 located beneath a small hole 100. The illumination passing through the opening 100 is periodically interrupted by the hands 104 and 106 of a watch 102 which have enlarged outer ends, as indicated most clearly in Fig. 3, serving to completely cover at periodic intervals the opening 94. The hands driven by the watch mechanism may, for example, be so arranged that one makes, say, one revolution in a half minute and the other one revolution every five minutes. In such case, there will be a short interruption of the light at half-minute intervals, while at five-minute intervals longer interruptions will occur due to the slower passage of the five-minute hand.

Located in the chamber 72 is a camera mechanism comprising a lens 108 projecting an image of the slit 76 and hole 100 upon motion picture film which passes from a supply reel 110 to a receiving reel 112 across the field of the lens in a direction transverse to the slit 76. This film is continuously driven by a motor 116 through reduction gearing and a sprocket wheel 114. If the apparatus is to be lowered on a wire line, the motor 116 is arranged to run continuously so that the film advances at a slow rate of speed, which rate, however, will be sufficient, when the rapidity of lowering of the apparatus is considered, to clearly distinguish formations which would be of interest.

Figures 6, 8:
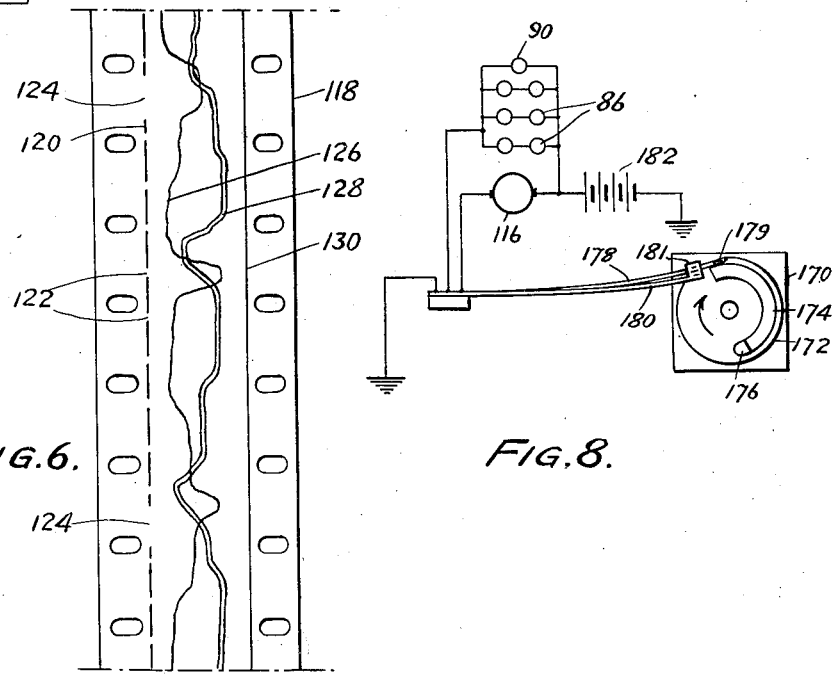
Fig. 6 is a fragmentary view showing the nature of the photographic record produced by the apparatus.
Fig. 8 is a diagram showing a circuit which may be used to produce alternating periods of activity and inactivity of the recording apparatus.

The type of record produced by the apparatus is illustrated in Fig. 6. There will be four traces on the film produced by the illuminated opening 100, the needles 82 and 78, and the bimetallic strip 88. These records are indicated respectively at 120, 126, 128 and 130. The first record as indicated above will consist of an interrupted straight line running the length of the film and provided with a series of short interruptions, every tenth one of which will be substantially longer so as to facilitate counting in the ultimate interpretation. The record of the needle 82 will be a wavy line 126 while the record of the needle 78 will be a double line 128 distinguishable from the line 126. The line 130 will be indicative of the temperature variation in the bore hole and as the instrument descends and the temperature rises will gradually move to the right until, when the temperature reaches a critical point rendering inoperative the thermostat control, this line will disappear entirely by reason of the passage of the strip 88 beyond the end of the slit 76.

With the circuit arrangements indicated there will, in general, be found some approximate correspondence between the indications of the meters 24 and 48, although by reason of the difference in depth of the electrode 10 and coil 16, there will be a lengthwise displacement on the film of the readings, the sign of which will depend upon whether the readings were made during raising or lowering of the apparatus and the amount of which will depend upon the rapidity of movement. Correlation is possible, however, through the time marks on the edge of the film. When strata of low resistivity is reached, the readings of ammeter 24 will increase. Likewise, the readings of the milliammeter 48 will increase. In the present apparatus standard meters are shown so that the increases are in opposite directions. These, however, may be quite readily followed. The load upon the oscillating circuit is dependent not only upon the resistivities of the surrounding strata, but also to some extent upon the dielectric constants. Therefore, exact correspondence of the two meter readings may not result and deviations from exact correspondence will be of interest in showing the extent to which the change of the dielectric constant has been influential upon the oscillating circuit.

If, instead of a coil 16, an antenna in the form of a wire extension is used as the exploring element, the effects upon the oscillator will be primarily due to changes in the dielectric constants of the formations which are penetrated. Consequently, there may be comparatively little agreement between the readings of the two meters but with a correspondingly greater amount of obtainable information because with such arrangement both variations in average specific resistivities and average dielectric constants may be noted and deductions more readily made as to the nature of the strata as well as their boundaries.

If an antenna is used in place of the coil 16, it may consist merely of a single insulated wire extending downwardly to a suitable distance below the electrode 10 to produce the desired field. The use of an antenna, however, has the disadvantage that thin formations may be missed entirely, though they will be picked up by a coil such as 16, which has comparatively little vertical extent.

In the circuit arrangement of Fig. 2 advantage is taken of the instability of the circuit to produce variations in the readings of a meter 48 to indicate changes in the formations penetrated by the bore hole. While this type of circuit may be conveniently used because of its simplicity and compactness where only qualitative results are desired, it is somewhat difficult to calibrate to give quantitative results because of the very fact of its instability. Accordingly there is given in Fig. 7 an illustration of a type of circuit which may be used for quantitative results. It will be obvious to those skilled in the electrical arts that many other types of circuits may be used to secure stabilized responses so that the meter, the indications of which are photographed, will give quantitative indications of the characteristics (either average specific resistivities or average dielectric constants) of the formations which are penetrated.

In Fig. 7 there is illustrated at 132 a very stable type of electron-coupled oscillator capable of maintaining oscillations of constant frequency despite substantial changes in temperature and applied voltages. At 134 there is shown a second oscillator which, by way of illustration, is of the Hartley type and which, with moderate care in temperature and voltage control, is also quite stable. Instead of this oscillator, however, there may be used the same type as that shown at 132, though the Hartley type of oscillator is to be preferred because it will continue to oscillate despite withdrawal of comparatively large amounts of power from its tank circuit. It will be noted that the plate portion of the tank coil of oscillator 134 consists of an electromagnetic field establishing means in the form of an exploring coil 136 across which and the grid portion of the tank coil the variable tank condenser 138 is shunted. Instead of using an exploratory coil such as 136, it will be obvious that a field may be established by an exploring antenna if the plate portion of the tank coil is included in the apparatus and there is arranged an antenna extending downwardly from the apparatus and providing a condenser parallel with condenser 138. The oscillations produced in the oscillator 134 are amplified by a buffer stage 142 arranged to prevent the oscillations of the oscillator 132 from pulling the oscillator 134 into step. The oscillator 132, it may be noted, will be unaffected by the oscillations produced in 134 by reason of the grounded screen grid of its tube.

The outputs of both the constant frequency oscillator 132 and the variable frequency oscillator 134 are fed through a coupling condenser 144 into a mixer stage indicated at 146, the tube of which may be a super-control type of pentode. The beat frequency produced in this stage is fed through the radio frequency choke 148 to one or more amplifier stages 150 and 152 and thence to an amplifier-automatic volume control stage 154 in which there may be used a diode-triode connected in conventional fashion so that the potential drop through a resistance 160 of the diode circuit will control the potentials of the grids of the tubes in the amplifying stages 150 and 152 through leads 156 and 158 respectively.

The output of the amplifying stage 154 is fed into the primary of a step-down transformer 162 which feeds through a network 164 into a rectifying mesh 166 connected to a direct current meter 168, which, in this alternative form of apparatus, is photographed instead of the meter 48 of the arrangement previously described.

The circuit in Fig. 7 need not be described in detail, since the various parts thereof are well known and should be arranged and shielded in accordance with the best present-day radio receiver practice. The two oscillators should be thermostatically controlled as described in connection with the previous modification of the invention and under such conditions will be extremely stable. Initial adjustment is so made that the minimum frequency produced by oscillator 134 will be higher than the constant frequency produced by oscillator 132. In this way there is avoided any possibility that the beat frequency may pass through a minimum and hence give results which may be difficult to interpret if this particular circuit is used. The output of the oscillator 134 may vary to a substantial extent depending upon the power which is absorbed in the formations through which the exploring coil or antenna passes. It is for this reason that the amplifying stages which receive the beat frequency output of the mixer stage are subject to automatic volume control. The result of this will be that irrespective of the beat frequency and also irrespective of substantial variations in the input voltage to the first amplifier stage, there will be provided across the primary of the transformer 162 a substantially constant beat frequency voltage. The transformer 162 should have a substantially flat characteristic for the beat frequency range in which the apparatus functions.

The output from the transformer 162 is fed into a network 164 of a special well known type, known as a corrective network. Only one section of such network is shown and will, in general, be sufficient. It is so designed that with a given terminal impedance it offers a constant resistance to the transformer secondary for all beat frequencies which are of interest. It also has a loss v. frequency characteristic which is very closely a straight line through the beat frequency range used, and in the particular case shown the network is such that the loss at the lower beat frequencies will be greater than the loss at the higher beat frequencies. The design of networks of this description will be found in K. S. Johnson's "Transmission circuits for telephonic communication," published by D. Van Nostrand Company of New York, 1925, page 232 et seq. The fact that the network has the characteristics indicated above will result in a linear response of the readings of the ammeter 168 to changes of frequency. Consequently it will be obvious that calibration may be very simply effected to give quantitative indications. The relationship of the meter readings 168 and hence of the beat frequency to the particular characteristics of the formations encountered by the bore hole may be ascertained by tests made with a particular exploring coil or antenna with other constants of the circuit fixed.

It will be further obvious that while not shown in Fig. 7 a direct current electrode and its circuit may be incorporated in this modification in the same fashion as in the modification of Fig. 2. The electrode should, of course, be incorporated in the grounded lead from the coil 136 or an antenna transmission line.

There has been mentioned above the desirability of interrupting the photographing of the instruments for definite periods when the exploring instrument is being lowered upon a drill stem. A circuit for this purpose is illustrated in Fig. 8. In this figure 170 diagrammatically indicates an accurate clockwork mechanism which may be synchronized with a mechanism on the surface. This clockwork mechanism drives a disc 172 which carries a cam 174 having a radial or undercut trailing edge and which, at its forward edge, has an axial extension in the form of a pin 176 which also has a radial or undercut trailing edge. The cam 174 is designed to engage spring members 178 and 179 of a switch while the pin 176 may engage all the spring members of this switch, namely, 178, 179 and 180. The member 179 is slightly longer than member 178. The member 180 has a portion 181 overlying the members 178 and 179. This switch is of a known type and will be found more fully described in a general fashion in the patent to G. L. Kothny, No. 2,102,456, dated August 27, 1935. The arrangement is such that when neither the cam 174 nor pin 176 engages the spring members, the three members lie side by side in the same plane with the overhanging portion 181 out of contact with the members 178 and 179. As the pin 176 engages them, it raises them simultaneously while they still remain out of contact. As soon, however, as the pin 176 clears the end of the shorter member 180, it will drop, causing the extension 181 to engage the members 178 and 179 and make circuit closing contacts. The member 180 is made stiffer than members 178 and 179 so that it will flex them and thus make good contact with both. The members 178 and 179 will be restrained from dropping by the cam 174 until they are successively cleared by the trailing end of this cam when they also will drop in sequence, thus opening their contacts. Due to the fact that both the opening and closing are occasioned by dropping of the spring members, it is obvious that both the making and breaking of the contacts may be very accurately timed. The switch just described is arranged in circuit with a battery 182 which provides current for the camera motor 116 and also for the various lamps 86 and 90. The lamps are connected to member 178 and the motor to member 179. By properly designing the cam 174, it will be clear that the camera will operate to photograph the instruments during predetermined periods and during other predetermined periods will be inoperative so that workmen at the surface will have an opportunity to add additional fourble lengths to the drill stem by which the instrument is lowered. By noting the time at the surface, it will be known when the camera is operating, and consequently when the exploratory lowering of the device should take place. It may be pointed out that even during the inactive periods of the camera the mechanism 102 will continue to operate to give correlations of depth and time entirely independent of minor inaccuracies in the determination of the operative and inoperative periods of the camera. The exact beginnings and ends of active periods will be indicated by the time marks. The successive opening of the contacts of members 178 and 179 is to provide a slight feed of film after the lamps go out so that slight breaks in the records will indicate when periods of inactivity occurred. The oscillator and amplifying mechanism, if that be used, should not be stopped at any time during the run because of the possibility of changing the constants of the circuit due to cooling of the tubes or the resistances or other operating elements. The oscillators and their associated apparatus take very little current and no particular gain would be secured by interrupting their operation in any event.

It will be clear from the above that various changes of rather radical character when viewed from the standpoint of design may be made without departing from the scope of the invention. Besides the instruments such as 24 and 48, there may be additionally photographed other instruments of the same nature as the temperature indicating means at 88 which will serve to provide a check on the proper functioning of the apparatus. In the case of either of the types of apparatus disclosed, it will, of course, be obvious if oscillations should cease. In the case of the apparatus of Fig. 2, the reading of the meter 48 will rise to a maximum which would not be obtained if any oscillations were being produced. In the case of Fig. 7, the meter 168 would give a zero reading. If some other circuits were used, however, it might be desirable to provide some additional instrument to indicate a failure of operation which might not be shown by the principal recording meter.

It will be clear also that the form of the exploratory element which establishes an electromagnetic field in the surrounding strata is subject to considerable variation. As has been noted, the axial length of a coil will have considerable influence on the detectability of thin strata. In case it is suspected that some formation of importance lies to one side of the bore hole or closely adjacent to it, it will be possible to provide a detecting coil having substantial directional characteristics in combination with means for determining the orientation of the apparatus so as to give information as to the direction in which the formation lies. The drill stem may be oriented during the descent and rotated through known amounts at noted times so that from the readings a deduction as to the direction of the formation may be made. Alternatively, there may be carried into the bore hole, secured to the exploring unit, a continuous well surveying instrument which, for this purpose, would need only indicate direction. From the records of such instrument correlated by time recording with the depth and the indications of the exploring apparatus and by rotating the entire apparatus at known times, definite deductions as to the direction of formations may be made. The type of instrument which may be used for this purpose may, for example, be that described in Williston and Nichols Patent No. 1,960,038, dated May 22, 1934, in which the readings of a gyroscope and bubble are correlated with time. Even if no directional results are desired, however, it will be clear that simultaneous exploration and surveying of a bore hole may be accomplished by the combination of a well surveying instrument such as that just noted with the apparatus forming the subject matter of this application.

What we claim and desire to protect by Letters Patent is:

1. Means for determining the location and character of strata penetrated by a bore hole comprising an exploring unit, and means for supporting said unit for movement within and lengthwise of the bore hole; said exploring unit including a generator of high frequency oscillations, means for establishing thereby an electromagnetic field penetrating strata in the vicinity of the bore hole, means responsive to varying effects upon said field of materials in the vicinity of the field establishing means, and means for automatically producing substantially continuous records of the responses of said responsive means related to the depths at which the responses occurred.

2. Means for determining the location and character of strata penetrated by a bore hole comprising an exploring unit, and means for supporting said unit for movement within and lengthwise of the bore hole; said exploring unit including a generator of high frequency oscillations, means for establishing thereby an electromagnetic field penetrating strata in the vicinity of the bore hole, means responsive to varying effects upon said field of materials in the vicinity of the field establishing means, means for automatically producing substantially continuous records of the responses of said responsive means, and means for recording substantially continuously the time of production of said records.

3. Means for determining the location and character of strata penetrated by a bore hole comprising an exploring unit, and means for supporting said unit for movement within and lengthwise of the bore hole; said exploring unit including a generator of high frequency oscillations, means for establishing thereby an electromagnetic field penetrating strata in the vicinity of the bore hole, means responsive to varying effects upon said field of materials in the vicinity of the field establishing means, and means for automatically producing records of the responses of said responsive means, said record producing means comprising devices for feeding a record strip lengthwise and means for producing a substantially continuous lengthwise record thereon of the responses of said responsive means.

4. Means for determining the location and character of strata penetrated by a bore hole comprising an exploring unit, and means for supporting said unit for movement within and lengthwise of the bore hole; said exploring unit including a generator of high frequency oscillations, means for establishing thereby an electromagnetic field penetrating strata in the vicinity of the bore hole, means responsive to varying effects upon said field of materials in the vicinity of the field establishing means, means for automatically producing records of the responses of said responsive means, said record producing means comprising devices for feeding a record strip lengthwise, means for producing a substantially continuous lengthwise record thereon of the responses of said responsive means, and means for recording on said strip a lengthwise time record adjacent to the record of said responses.

5. Means for determining the location and character of strata penetrated by a bore hole comprising an exploring unit, and means for supporting said unit for movement within and lengthwise of the bore hole; said exploring unit including a generator of high frequency oscillations, means for establishing thereby an electromagnetic field penetrating strata in the vicinity of the bore hole, means responsive to varying effects upon said field of materials in the vicinity of the field establishing means, and means for automatically producing records of the responses of said responsive means, said record producing means comprising devices for feeding a record strip lengthwise, means for producing during lengthwise movements of the strip a lengthwise record thereon of the responses of said responsive means, and means for imparting predetermined periods of activity and inactivity to said feeding means, said feeding means imparting a continuous feed to the strip during its periods of activity.

6. Means for determining the location and character of strata penetrated by a bore hole comprising an exploring unit, and means for supporting said unit for movement within and lengthwise of the bore hole; said exploring unit including a generator of high frequency oscillations, means for establishing thereby an electromagnetic field penetrating strata in the vicinity of the bore hole, means responsive to varying effects upon said field of materials in the vicinity of the field establishing means, means for automatically producing records of the responses of said responsive means, and means for maintaining substantially constant the temperature of said generator.

7. Means for determining the location and character of strata penetrated by a bore hole comprising an exploring unit, and means for supporting said unit for movement within and lengthwise of the bore hole; said exploring unit including a generator of high frequency oscillations, means for establishing thereby an electromagnetic field penetrating strata in the vicinity of the bore hole, said generator having variable frequency depending upon the strata through which the field establishing means is passing, a constant frequency oscillation generator, means responsive to changes in beat frequency of the oscillations of said two generators due to materials in the vicinity of the field establishing means, and means for automatically producing records of the responses of the last named means.

8. Means for determining the location and character of strata penetrated by a bore hole comprising an exploring unit, and means for supporting said unit for movement within and lengthwise of the bore hole; said exploring unit including a generator of high frequency oscillations, means for establishing thereby an electromagnetic field penetrating strata in the vicinity of the bore hole, said last named means being interconnected to said generator so that the frequency of oscillations produced by the generator is affected by materials in the vicinity of the field establishing means, means responsive to frequency variations of the oscillations, and means for automatically producing records of the responses of the last named means.

9. Means for determining the location and character of strata penetrated by a bore hole comprising an exploring unit, and means for supporting said unit for movement within and lengthwise of the bore hole; said exploring unit including a generator of high frequency oscillations, means for establishing thereby an electromagnetic field penetrating strata in the vicinity of the bore hole, means responsive to varying effects upon said field of materials in the vicinity of the field establishing means, an electrode in the bore hole in the vicinity of said field, means for establishing a flow of current between said electrode and the strata adjacent thereto, and means for automatically producing records of the responses of said responsive means and the values of said current.

10. The method of determining the location and character of strata penetrated by a bore hole comprising generating high frequency oscillations within the bore hole, establishing thereby a localized electromagnetic field penetrating strata in the vicinity of the bore hole, moving said localized field lengthwise of the bore hole, and recording substantially continuously, within the bore hole closely adjacent said field, the varying effects upon the field of materials which it penetrates.

11. The method of determining the location and character of strata penetrated by a bore hole comprising generating high frequency oscillations within the bore hole, establishing thereby a localized electromagnetic field penetrating strata in the vicinity of the bore hole, moving said localized field lengthwise of the bore hole, and recording substantially continuously, within the bore hole closely adjacent said field, the varying effects upon the field of materials which it penetrates, and the times at which said varying effects are recorded.

12. Means for determining the location and character of formations penetrated by a bore hole comprising an exploring unit, said exploring unit including means responsive to the characteristics of formations in the vicinity of the bore hole, and means for photographically recording the responses of said responsive means, said recording means comprising a camera having an image-projecting lens system, means for continuously moving a film across the focal plane of the camera during recording periods, and means controlled by said responsive means providing a spot projected on the film and movable transversely of the direction of movement of the film; and means for supporting said unit for movement within and lengthwise of the bore hole.

13. Means for determining the location and character of formations penetrated by a bore hole comprising an exploring unit, said exploring unit including means responsive to the characteristics of formations in the vicinity of the bore hole, means for photographically recording the responses of said responsive means, said recording means comprising a camera having an image-projecting lens system, means for continuously moving a film across the focal plane of the camera during recording periods, and means controlled by said responsive means providing a spot projected on the film and movable transversely of the direction of movement of the film, and means for producing time marks on the film; and means for supporting said unit for movement within and lengthwise of the bore hole.

14. Means for determining the location and character of formations penetrated by a bore hole comprising an exploring unit, said exploring unit including a generator of high frequency oscillations, means for establishing thereby an electromagnetic field penetrating formations in the vicinity of the bore hole, a sensitized film, means for advancing said film in the direction of its length, means for projecting on said film a spot of light, and means for moving, while the film is advancing, said spot of light transversely of the film in response to varying effects upon said field of materials in the vicinity of the field establishing means; and means for supporting said unit for movement within and lengthwise of the bore hole.

15. Means for determining the location and character of formations penetrated by a bore hole comprising an exploring unit, said exploring unit including a generator of high frequency oscillations, means for establishing thereby an electromagnetic field penetrating formations in the vicinity of the bore hole, a sensitized film, means for advancing said film, and means, responsive to varying effects upon said field of materials in the vicinity of the field establishing means, for exposing said film to provide indicia thereon the transverse location of which on the film corresponds to said varying effects; and means for supporting said unit for movement within and lengthwise of the bore hole.

16. Means for determining the location and character of formations penetrated by a bore hole comprising an exploring unit, said exploring unit inclluding a generator of high frequency oscillations, means for establishing thereby an electromagnetic field penetrating formations in the vicinity of the bore hole, a sensitized film, means for advancing said film in the direction of its length, means for projecting on said film a spot of light, means for moving, while the film is advancing, said spot of light transversely of the film in response to varying effects upon said field of materials in the vicinity of the field establishing means, and means for producing timing markings on said film recording the time of formation of portions of the record produced by said spot of light; and means for supporting said unit for movement within and lengthwise of the bore hole.

17. Means for determining the location and character of formations penetrated by a bore hole comprising an exploring unit, said exploring unit including a generator of high frequency oscillations, means for establishing thereby an electromagnetic field penetrating formations in the vicinity of the bore hole, a sensitized film, means for advancing said film, means responsive to varying effects upon said field of materials in the vicinity of the field establishing means, for exposing said film to provide indicia thereon the transverse location of which on the film corresponds to said varying effects, and means for producing timing markings on said film recording the time of formation of said indicia; and means for supporting said unit for movement within and lengthwise of the bore hole.

18. Means for determining the location and character of strata penetrated by a bore hole comprising an exploring unit, said exploring unit including a vacuum tube generator of high frequency oscillations comprising grid and plate circuits, one of the circuits comprising means for establishing a natural frequency of oscillation for that circuit, means for establishing an electromagnetic field penetrating formations in the vicinity of the bore hole, said last named means forming a part of the other of said circuits, and means responsive to variations in operation of the generator due to changes of impedance of the field establishing means resulting from different materials in the vicinity thereof; and means for supporting said unit for movement within and lengthwise of the bore hole.

19. Means for determining the location and character of strata penetrated by an exploring unit, said exploring unit including a vacuum tube generator of high frequency oscillations, a grid circuit comprising means establishing a natural frequency of oscillation for the grid circuit, means for establishing by said generator an electromagnetic field penetrating formations in the vicinity of the bore hole, said last named means forming a part of the plate circuit, and means responsive to variations in operation of the generator due to changes of impedance of the field establishing means resulting from different materials, in the vicinity thereof; and means for supporting said unit for movement within and lengthwise of the bore hole.

20. Means for determining the location and character of strata penetrated by an exploring unit, said exploring unit including a vacuum tube generator of high frequency oscillations comprising grid and plate circuits, one of the circuits comprising means for establishing a natural frequency of oscillation for that circuit, and means for establishing an electromagnetic field penetrating formations in the vicinity of the bore hole, said last named means forming a part of the other of said circuits; means for supporting said unit for movement within and lengthwise of the bore hole; and means responsive to variations in operation of the generator due to changes of impedance of the field establishing means.

21. An apparatus for measuring small changes in impedance comprising a vacuum tube having a plate and a grid, an oscillating circuit in the plate circuit, an oscillating circuit in the grid circuit, means for inductively connecting the changing impedance to be observed to at least one of said oscillating circuits in such a manner that changes in said impedance change the relative resonant frequencies of the plate and grid circuits to thereby effect a change in the coupling between the plate and the grid and a change in the direct current component of the plate current, and means for measuring said direct current component.

JOHN M. PEARSON.
GEORGE A. SMITH.